(12) United States Patent
Motomura et al.

(10) Patent No.: US 10,796,507 B2
(45) Date of Patent: Oct. 6, 2020

(54) IMAGE DISPLAY SYSTEM, IMAGE DISPLAY METHOD, AND RECORDING MEDIUM

(71) Applicant: Panasonic Intellectual Property Management Co., Ltd., Osaka (JP)

(72) Inventors: Hideto Motomura, Kyoto (JP); Sahim Kourkouss, Osaka (JP); Hisaji Murata, Osaka (JP); Koichi Emura, Kanagawa (JP); Eriko Ohdachi, Kanagawa (JP); Masanaga Tsuji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/523,822

(22) Filed: Jul. 26, 2019

(65) Prior Publication Data

US 2019/0347879 A1    Nov. 14, 2019

Related U.S. Application Data

(63) Continuation of application No. PCT/JP2018/005419, filed on Feb. 16, 2018.

(30) Foreign Application Priority Data

Feb. 23, 2017 (JP) .................................. 2017-032714

(51) Int. Cl.
  *G07C 5/08* (2006.01)
  *B60K 35/00* (2006.01)
  (Continued)

(52) U.S. Cl.
  CPC ............ *G07C 5/0825* (2013.01); *B60K 35/00* (2013.01); *B60R 21/00* (2013.01); *B60W 40/10* (2013.01); *B60W 50/10* (2013.01); *B60W 50/14* (2013.01)

(58) Field of Classification Search
  None
  See application file for complete search history.

(56) References Cited

U.S. PATENT DOCUMENTS 10,324,463 B1 *   6/2019  Konrardy ............ B60W 50/082
10,589,751 B2 *   3/2020  Nagy .................. B60W 30/095
  (Continued)

FOREIGN PATENT DOCUMENTS

JP      2005-067483       3/2005
JP      2009-245149      10/2009
  (Continued)

OTHER PUBLICATIONS

International Search Report of PCT application No. PCT/JP2018/005419 dated May 15, 2018.

*Primary Examiner* — Chico A Foxx
(74) *Attorney, Agent, or Firm* — Seed IP Law Group LLP

(57) ABSTRACT

An image display system includes a first processor, a second processor, and a comparator. The first processor acquires a behavior estimation result of a vehicle, and generates future position information after a predetermined time passes of the vehicle based on the behavior estimation result. The second processor acquires present information about the vehicle, and generates present position information on the vehicle and a peripheral object based on the acquired information. The comparator compares the future position information on the vehicle and the present position information on the vehicle and the peripheral object, and generates present image data indicating present positions of the vehicle and the peripheral object and future image data indicating positions of the vehicle and the peripheral object. Further, the comparator allows a notification device to display a present image based on the present image data and a future image based on the future image data together.

11 Claims, 9 Drawing Sheets

(51) Int. Cl.
*B60R 21/00* (2006.01)
*B60W 40/10* (2012.01)
*B60W 50/10* (2012.01)
*B60W 50/14* (2020.01)

(56) References Cited

U.S. PATENT DOCUMENTS

| | | | | |
|---|---|---|---|---|
| 2006/0111838 A1* | 5/2006 | Hughes | G01C 21/3679 | 701/412 |
| 2007/0282523 A1* | 12/2007 | Diekhans | A01B 69/007 | 701/466 |
| 2010/0121576 A1* | 5/2010 | Aso | G01S 13/726 | 701/301 |
| 2010/0253493 A1* | 10/2010 | Szczerba | G08G 1/167 | 340/435 |
| 2011/0090073 A1* | 4/2011 | Ozaki | B60R 1/00 | 340/435 |
| 2013/0179023 A1* | 7/2013 | Schmidt | B60W 50/16 | 701/23 |
| 2013/0223686 A1* | 8/2013 | Shimizu | G08G 1/166 | 382/103 |
| 2013/0325311 A1* | 12/2013 | Yoo | G08G 1/16 | 701/301 |
| 2015/0321699 A1* | 11/2015 | Rebhan | B60W 30/16 | 701/23 |
| 2016/0052394 A1* | 2/2016 | Yamada | B60W 30/16 | 701/93 |
| 2016/0231743 A1* | 8/2016 | Bendewald | B60W 30/12 | |
| 2016/0350974 A1* | 12/2016 | Hashimoto | B60R 1/00 | |
| 2016/0363454 A1* | 12/2016 | Hatanaka | G01C 21/34 | |
| 2017/0276494 A1* | 9/2017 | Kusano | G01C 21/3415 | |
| 2017/0334459 A1* | 11/2017 | McNew | B60R 11/0229 | |
| 2017/0341661 A1* | 11/2017 | Nishiyama | G05D 1/0061 | |
| 2017/0358219 A1* | 12/2017 | Garai | B64D 43/02 | |
| 2017/0361853 A1* | 12/2017 | Nagy | B60W 30/095 | |
| 2018/0105186 A1 | 4/2018 | Motomura et al. | | |
| 2018/0357473 A1* | 12/2018 | Soma | G10L 15/22 | |
| 2018/0362047 A1* | 12/2018 | Hagawa | G08G 1/165 | |
| 2019/0144004 A1* | 5/2019 | Mimura | G01C 21/3635 | 701/28 |
| 2019/0286296 A1* | 9/2019 | Shibata | G06F 3/0482 | |
| 2019/0340522 A1* | 11/2019 | Mori | G06N 20/00 | |

FOREIGN PATENT DOCUMENTS

| | | |
|---|---|---|
| JP | 2013-250961 A | 12/2013 |
| WO | 2016/170786 A1 | 10/2016 |

* cited by examiner

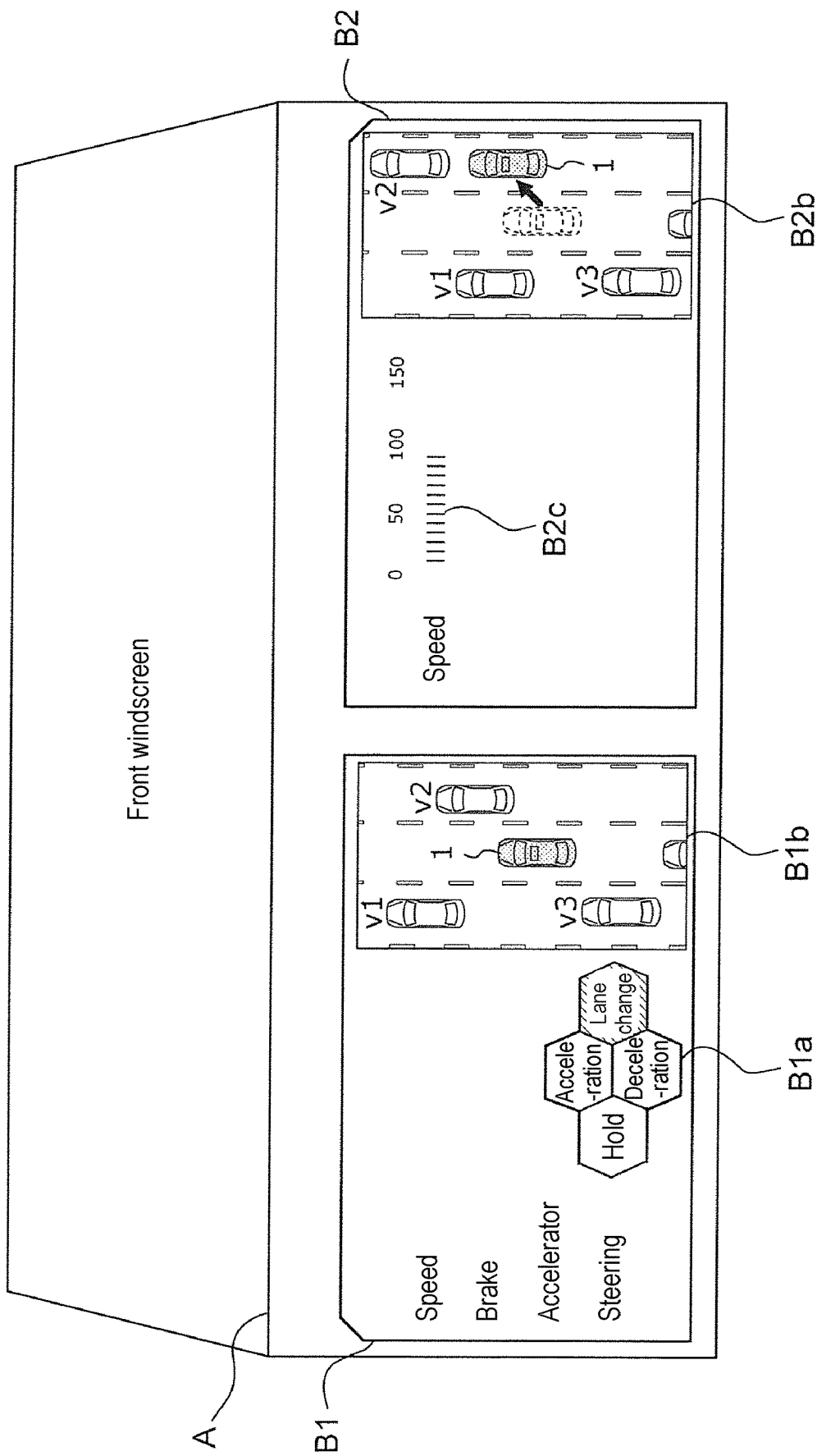

US 10,796,507 B2

IMAGE DISPLAY SYSTEM, IMAGE DISPLAY METHOD, AND RECORDING MEDIUM

TECHNICAL FIELD

The present disclosure relates to an image display system that displays information about behavior estimation of a vehicle, an image display method, and a program.

BACKGROUND ART

In recent years, a technique for automating driving of a vehicle such as an automobile that runs on a road has been studied. For example, PTL 1 discloses a running control device of a vehicle, and this running control device is configured to, when performing, on own vehicle, automatic steering control or automatic acceleration/deceleration control, allow a driver to visually recognize operating states of the automatic steering control and the automatic acceleration/deceleration control.

CITATION LIST

Patent Literature

PTL 1: Unexamined Japanese Patent Publication No. 2005-67483

SUMMARY OF THE INVENTION

The present disclosure provides an image display system that provides information about future behavior of a vehicle, an image display method, and a program.

An image display system according to one aspect of the present disclosure includes a first processor, a second processor, and a comparator. The first processor acquires a behavior estimation result that is a behavior estimation result of a vehicle, and generates future position information after a predetermined time passes of the vehicle based on the behavior estimation result. The second processor acquires present information about the vehicle, and generates present position information on the vehicle and an object around the vehicle based on the acquired information. The comparator compares the future position information on the vehicle and the present position information on the vehicle and the object around the vehicle, and generates present image data indicating present positions of the vehicle and the object around the vehicle and future image data indicating future positions of the vehicle and the object around the vehicle. The comparator allows a display device to display a present image based on the present image data and a future image based on the future image data together.

In an image display method according to one aspect of the present disclosure, present information about a vehicle is acquired, and present position information on the vehicle and an object around the vehicle is generated based on the acquired information. Further, a behavior estimation result that is a behavior estimation result of the vehicle is acquired, and future position information after a predetermined time passes of the vehicle is generated based on the behavior estimation result. Furthermore, the future position information on the vehicle and the present position information on the vehicle and the object around the vehicle are compared, and present image data indicating present positions of the vehicle and the object around the vehicle and future image data indicating future positions of the vehicle and the object around the vehicle are generated. Furthermore, a present image based on the present image data and a future image based on the future image data are displayed together.

A program according to one aspect of the present disclosure is a program for causing a computer to execute an image display method, and in the image display method, present information about a vehicle is acquired, present position information on the vehicle and an object around the vehicle is generated based on the acquired information, a behavior estimation result that is a behavior estimation result of the vehicle is acquired, and future position information after a predetermined time passes of the vehicle is generated based on the behavior estimation result. Further, in the image display method, the future position information on the vehicle and the present position information on the vehicle and the object around the vehicle are compared, and present image data indicating present positions of the vehicle and the object around the vehicle and future image data indicating future positions of the vehicle and the object around the vehicle are generated. Furthermore, in the image display method, a present image based on the present image data and a future image based on the future image data are displayed together.

It should be noted that these comprehensive or specific aspects may be implemented by a system, a method, an integrated circuit, a computer program, or a (non-transitory) recording medium such as a computer readable CD-ROM, or may be implemented by any combination of the system, the method, the integrated circuit, the computer program, and the recording medium.

According to an image display system and the like of the present disclosure, information about future behavior of a vehicle can be provided.

BRIEF DESCRIPTION OF DRAWINGS

FIG. 9 illustrates an example of a display image of the notification device according to an instruction from a driver of the vehicle.

DESCRIPTION OF EMBODIMENT

Figure 1:
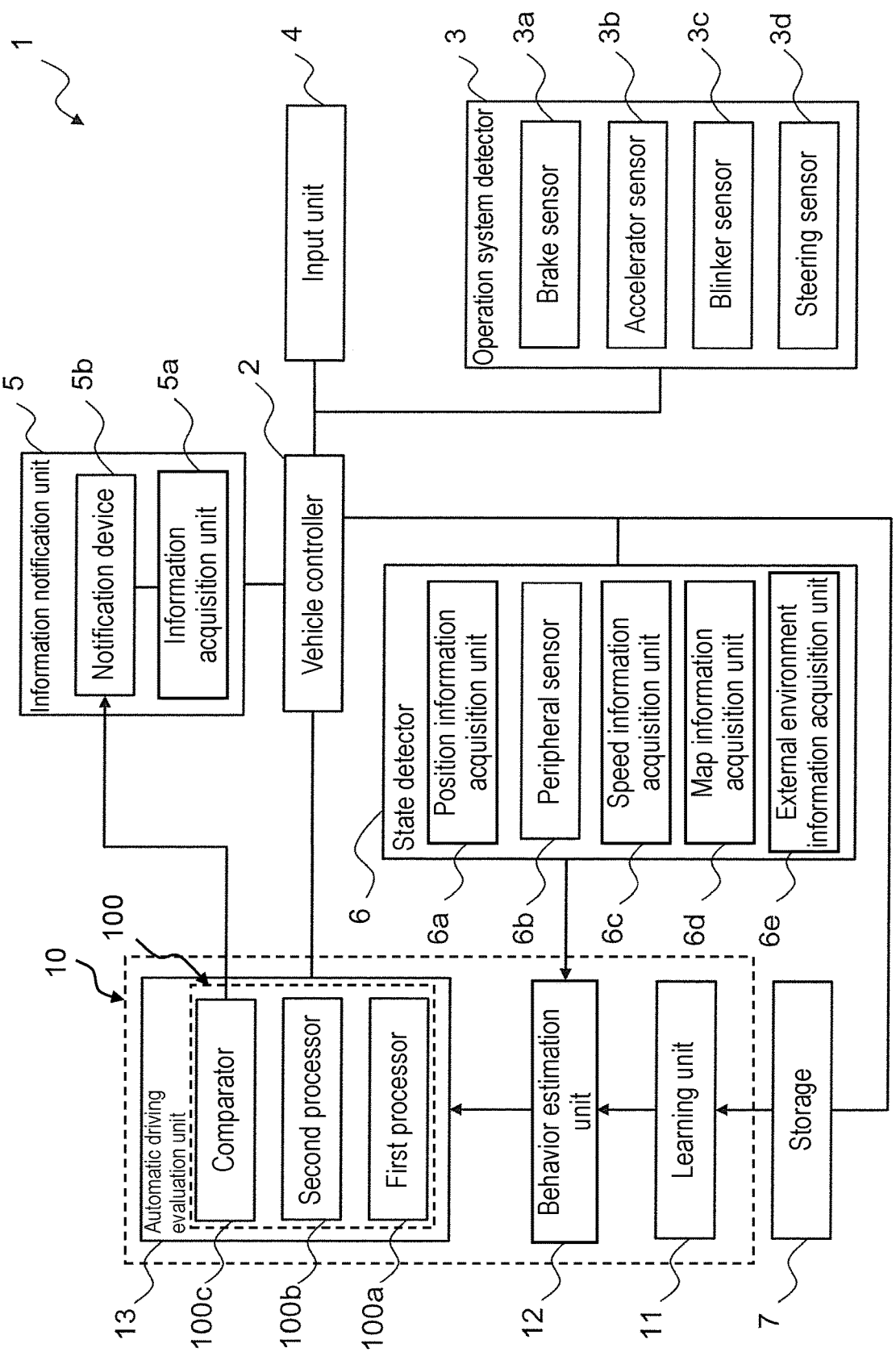
FIG. 1 is a functional block diagram of an example of an image display system and components around the image display system according to an exemplary embodiment.

Prior to describing an exemplary embodiment of the present disclosure, problems of the conventional device will be briefly described. The running control device in PTL 1 allows a driver to visually recognize a present operating state of automatic steering control and automatic acceleration/deceleration control. During automatic driving, since the driver does not perceive how much a running state, a peripheral condition, etc. are recognized by the vehicle and future behavior to be performed by the vehicle, the driver may feel anxious.

The running control device described in PTL 1 performs running control based on own vehicle position information positioned by a global positioning system (GPS) of an onboard car navigation device. According to an automatic driving technique of a vehicle studied by the inventors of the present invention, in addition to own vehicle positioning using a GPS, detection results by a detection device that detects each operation of a vehicle, and detection results by detection devices that detect peripheral environment of the vehicle, such as a camera, a millimeter-wave radar, an infrared sensor, are used. Such an automatic driving technique enables control of complicated vehicle behavior corresponding to a state and a peripheral condition of the vehicle. Also, in study of such an automatic driving technique, it is intended to enable not just partly automated driving for assisting driver's driving, but fully automated driving that prevents intervention of driver's behavior such as operation or judgement. When dependence on the vehicle rises in behavior control, information about a present state of the vehicle and information about future behavior of the vehicle which is subsequent behavior of a present behavior become more unclear to the driver. Thus, the driver may feel anxious. Therefore, the inventors of the present invention have studied to provide information about future behavior of the vehicle to suppress anxiety of the driver and found out a technique described in the claims and the following explanation.

Hereinafter, an image display system and the like according to an exemplary embodiment will be described with reference to the drawings. It should be noted that the exemplary embodiment that will be described below provides comprehensive or specific examples of the present invention. Numerical values, shapes, materials, components, arrangement positions and connection modes of the components, steps, order of the steps, and the like illustrated in the following exemplary embodiment are merely examples, and therefore are not intended to limit the present disclosure. Among the components in the exemplary embodiment described below, components which are not described in the independent claims showing the top level concept are described as arbitrary components. Further, in the exemplary embodiment described below, an expression using "substantially" such as substantially parallel or substantially orthogonal may be used. For example, substantially parallel denotes not only perfectly parallel, but also denotes substantially parallel, that is, including a difference of, for example, about several %. The same applies to other expression using "substantially".

EXEMPLARY EMBODIMENT

[1. Configuration of Image Display System]

A configuration of image display system 100 according to the exemplary embodiment will be described with reference to FIG. 1. Note that FIG. 1 is a functional block diagram of an example of image display system 100 and components around image display system 100 according to the exemplary embodiment. In the present exemplary embodiment, image display system 100 is mounted on vehicle 1 capable of running on a road, such as an automobile, a truck, or a bus. Image display system 100 configures a part of automatic driving control system 10 that controls full or a part of driving of vehicle 1 without requiring driver's operation of vehicle 1. Note that a mounting target of image display system 100 is not limited to vehicle 1, and that image display system may be mounted to any moving body, such as an airplane, a ship, or an unmanned conveyer. Image display system 100 according to the present exemplary embodiment allows a display device to display a present state of vehicle 1 and around vehicle 1 and a future state of vehicle 1 and around vehicle 1 generated by behavior performed by automatic driving control system 10.

As illustrated in FIG. 1, vehicle 1 includes vehicle controller 2, operation system detector 3, input unit 4, information notification unit 5, state detector 6, storage 7, automatic driving control system 10, and image display system 100. Automatic driving control system 10 controls automatic driving of vehicle 1. Automatic driving control system 10 includes learning unit 11, behavior estimation unit 12, and automatic driving evaluation unit 13. Image display system 100 calculates a present state of vehicle 1 and around vehicle 1 and a future state of vehicle 1 and around vehicle 1 and causes information notification unit 5 to display the calculated states. Image display system 100 configures a part of automatic driving evaluation unit 13 and includes first processor 100a, second processor 100b, and comparator 100c. Note that image display system 100 may be provided separately from automatic driving evaluation unit 13. The components of automatic driving control system 10, the components of image display system 100, components of state detector 6, which will be described below, and the like may include dedicated hardware or may be implemented by executing software programs suitable for the components. The components may be implemented in such a manner that a program execution section such as a central processing unit (CPU) or a processor reads and executes software programs recorded in a recording medium such as a hard disk or a semiconductor memory.

Vehicle controller 2 controls entire vehicle 1. For example, vehicle controller 2 may be implemented as a part of a large scale integration (LSI) circuit or an electronic control unit (ECU) controlling vehicle 1. Vehicle controller 2 controls vehicle 1 based on information received from automatic driving control system 10 and the like. Vehicle controller 2 may include automatic driving control system 10 and image display system 100.

Operation system detector 3 detects information about operation applied to vehicle 1. Operation system detector 3 includes brake sensor 3a, accelerator sensor 3b, blinker sensor 3c, and steering sensor 3d. Brake sensor 3a detects brake strength of a brake device of vehicle 1. Accelerator sensor 3b detects an accelerator position of vehicle 1. Blinker sensor 3c detects a direction indicated by a blinker of vehicle 1. Steering sensor 3d detects a steering angle of vehicle 1. Operation system detector 3 detects information operated by a driver of vehicle 1 and information operated by automatic driving control system 10. The sensors of operation system detector 3 output the detection results to vehicle controller 2 and further store the detection results in storage 7.

State detector 6 detects a running state of vehicle 1 and a peripheral condition of vehicle 1. State detector 6 includes position information acquisition unit 6a, peripheral sensor 6b, speed information acquisition unit 6c, map information acquisition unit 6d, and external environment information acquisition unit 6e.

Position information acquisition unit 6a acquires position information on vehicle 1 from a GPS positioning result and the like by a car navigation device mounted on vehicle 1.

Peripheral sensor 6*b* detects a peripheral condition of vehicle 1. For example, peripheral sensor 6*b* detects position, lane position information, and the like on another vehicle existing around vehicle 1 and further detects a position type of the other vehicle, for example, a preceding vehicle of vehicle 1. For example, peripheral sensor 6*b* also detects time to collision (TTC) of two vehicles from a speed of the other vehicle and a speed of vehicle 1. For example, peripheral sensor 6*b* also detects a position of an obstacle existing around vehicle 1. Such peripheral sensor 6*b* can include a millimeter-wave radar, a laser radar, a camera, or a combination of these devices.

Speed information acquisition unit 6*c* acquires information on a running state of vehicle 1. For example, speed information acquisition unit 6*c* acquires, as the above information, information about a speed and a running direction of vehicle 1 from an unillustrated speed sensor or the like of vehicle 1. Map information acquisition unit 6*d* acquires map information indicating a peripheral condition of vehicle 1. Map information acquisition unit 6*d* acquires, as the above map information, map information, such as a road on which vehicle 1 is running, a merging point with another vehicle on the road, a lane in which vehicle 1 is currently running on the road, a position of an intersection on the road, or the like. External environment information acquisition unit 6*e* acquires external environment information which is information about peripheral environment of vehicle 1. The external environment information includes traffic jam information, weather information, accident history information, and the like on a road on which vehicle 1 is running. External environment information acquisition unit 6*e* acquires the traffic jam information from, for example, Vehicle Information and Communication System (registered trademark) (VICS) and acquires weather information and accident history information by, for example, communication via a communication network such as the Internet. The components of state detector 6 output the detection results to vehicle controller 2 and further store the detection results in storage 7.

Input unit 4 accepts an input by a driver of vehicle 1. For example, input unit 4 may include a switch disposed on a steering of vehicle 1 or may be a touch panel disposed at a position reached by a hand of the driver. The touch panel is a device including a panel such as a liquid crystal panel and capable of displaying and inputting information. Input unit 4 outputs the input information to vehicle controller 2 and further stores the input information in storage 7.

Information notification unit 5 displays various information based on acquired information. Information notification unit 5 includes information acquisition unit 5*a* that acquires information and notification device 5*b* that displays the acquired information as an image. Information acquisition unit 5*a* acquires information from vehicle controller 2 and the like and allows notification device 5*b* to display the acquired information. Information acquisition unit 5*a* may also acquire output information from operation system detector 3, output information from input unit 4, output information from state detector 6, etc. and display the acquired output information on notification device 5*b*. Information acquisition unit 5*a* may have a configuration similar to configurations of the components of aforementioned automatic driving control system 10 and the like.

Notification device 5*b* is a display device that displays information about vehicle 1. Notification device 5*b* may be a head up display (HUD), a liquid crystal display (LCD), an organic or inorganic electro luminescence (EL) display, a head-mounted display or a helmet-mounted display (HMD), smart glasses, and other exclusive displays. The HUD may have a configuration using a windshield of vehicle 1, or may be a configuration using a glass surface or a plastic surface (for example, combiner) separately provided from the windshield, for example. Further, the windshield may be a front windscreen of vehicle 1, or may be a side windscreen or a rear windscreen of vehicle 1.

Figure 2:
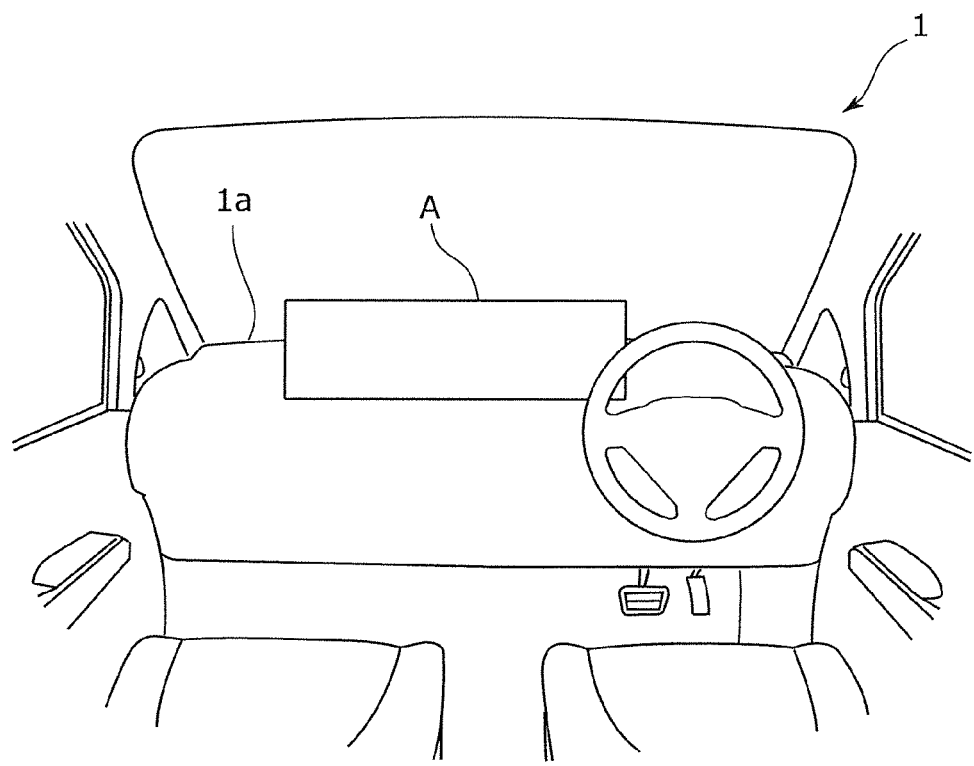
FIG. 2 illustrates an example of a display medium of a notification device illustrated in FIG. 1 in a vehicle.
Figure 3:
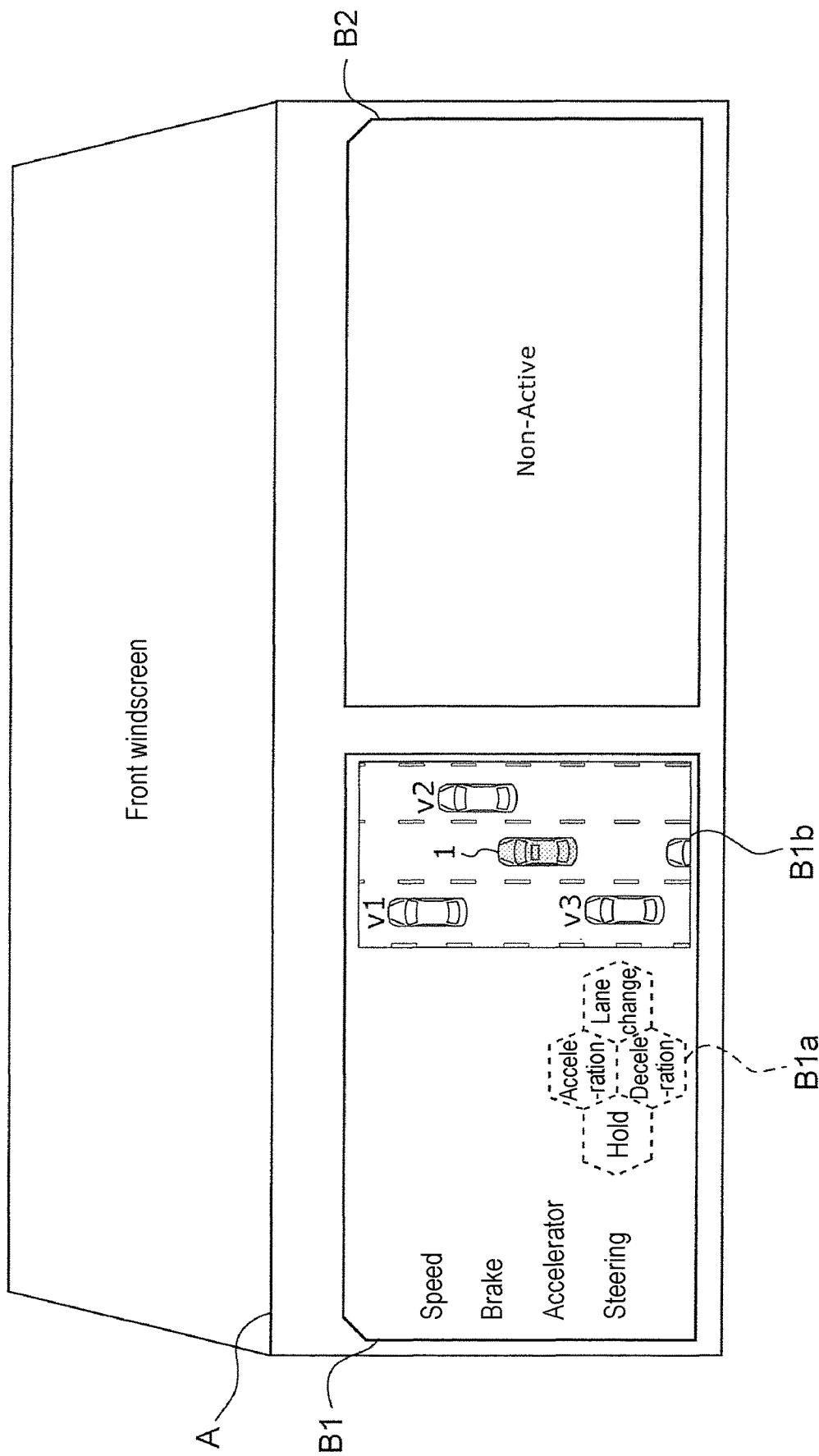
FIG. 3 illustrates an example of a display image of the notification device when only a present image is displayed.

Although it is not limited to this, in the present exemplary embodiment, as illustrated in FIG. 2, notification device 5*b* projects an image indicating various information onto glass A with glass A provided on dashboard 1*a* of the front windscreen of vehicle 1 being a display medium. Note that FIG. 2 illustrates an example of the display medium of notification device 5*b* illustrated in FIG. 1 in vehicle 1. Also, as illustrated in FIG. 3, notification device 5*b* displays present image B1 and future image B2 side by side on a surface of glass A. Present image B1 displays a present state of vehicle 1, and future image B2 displays a future state of vehicle 1 to be estimated. Note that FIG. 3 illustrates an example of an image displayed by notification device 5*b*. When the future state of vehicle 1 cannot be acquired, as illustrated in FIG. 3, nothing is displayed as future image B2. In present image B1, present running states such as a speed, brake strength, an accelerator position, and a steering angle, of vehicle 1, an automatic driving state performed by vehicle 1, and a bird's eye view that displays present vehicle 1 and a vehicle around vehicle 1 on a map can be displayed. In future image B2, a future running state of vehicle 1 and a bird's eye view that displays future vehicle 1 and a vehicle around vehicle 1 on a map can be displayed. In the example of FIG. 3, a road as a map and vehicle 1 and peripheral vehicles (vehicle ID: v1 to v3) on the road are displayed in the bird's eye view of present image B1. Note that the vehicle ID is an identifier set to each of the peripheral vehicle(s).

Returning to FIG. 1, storage 7 may be a storage device such as a read only memory (ROM), a random access memory (RAM), a hard disk device, a solid state drive (SSD), or the like. Storage 7 stores various information such as detection results of operation system detector 3, input information to input unit 4, detection results of state detector 6, knowledge for behavior estimation in automatic driving control system 10 (also called machine learning data), and a neural network used for machine learning, which will be described below. Further, storage 7 stores a correspondence relationship between running environment at present time of vehicle 1 and a candidate for behavior that can be subsequently taken by vehicle 1.

Learning unit 11 in automatic driving control system 10 constructs machine learning data for behavior estimation corresponding to a specific driver of vehicle 1. In the present exemplary embodiment, learning unit 11 uses a neural network (hereinafter also referred to as "NN") for machine learning, but learning unit 11 may use other machine learning methods. Herein, the neural network is an information processing model using a cranial nervous system as a model. The neural network is composed of a plurality of node layers including an input layer and an output layer. The node layer includes one or more nodes. Model information on the neural network represents a number of node layers that constitute the neural network, a number of nodes included in each of the node layers, and a class of the whole neural network or a class of each of the node layers. When the neural network is composed of, for example, three node layers, that is, an input layer, an intermediate layer, and an output layer, a number of nodes of the input layer can be 100, for example, a number of nodes of the intermediate layer can be 100, for example, and a number of nodes of the output layer can be 5, for example. The neural network sequentially performs, on information input to a node in the input layer, output processing from the input layer to the intermediate layer, processing in the intermediate layer, output processing from the intermediate layer to the output layer, and processing in the output layer, and then outputs an output result suitable for the input information. Note that each node in one layer is connected with each node in a subsequent layer and the connection between the nodes is weighted. The weighting of the connection between the nodes is applied to information on the node in the one layer, and the information is output to the node in the subsequent layer.

Learning unit 11 constructs a neural network of specific driver x of vehicle 1 from a driving history of driver x. Alternatively, learning unit 11 may construct a neural network of specific driver x of vehicle 1 from the driving history of driver x and general-purpose driving histories of a plurality of drivers other than driver x. Alternatively, learning unit 11 may construct a neural network of specific driver x of vehicle 1 from a running history of driver x. Alternatively, learning unit 11 may construct a neural network of specific driver x of vehicle 1 from the running history of driver x and general-purpose running histories of the plurality of drivers other than driver x. Learning unit 11 may construct a neural network by using at least one of a case where the driving history of specific driver x is used, a case where the driving history of specific driver x and the general-purpose driving histories are used, a case where the running history of specific driver x is used, and a case where the running history of specific driver x and the general-purpose running histories are used. Note that the plurality of drivers may be a large number of unspecified drivers and may not be related to vehicle 1. Then, learning unit 11 outputs the constructed neural network to behavior estimation unit 12 as a behavior estimation NN.

The driving history is constructed by associating each behavior performed by a vehicle in the past with a plurality of feature quantities (hereinafter also referred to as "feature quantity set"). For example, each of the feature quantities corresponding to the behavior is an amount indicating a running state of the vehicle from a time at which the behavior is started by the vehicle to a time before a first predetermined time passes. The first predetermined time may be a preset time, and may be, for example, a time until next behavior is started. The general-purpose driving histories are driving histories of a large number of unspecified vehicles. For example, a behavior and a feature quantity set corresponding to the behavior are combined and stored in storage 7. The feature quantity is a parameter relating to behavior of the vehicle and represents, for example, a number of passengers in the vehicle, a speed of the vehicle, a movement of a steering, a degree of braking, a degree of acceleration, etc. The feature quantity is, for example, a running state of the vehicle to be detected by operation system detector 3 and state detector 6.

The running history is constructed by associating each behavior performed by a vehicle in the past with a plurality of environmental parameters (hereinafter also referred to as "environmental parameter set"). For example, each of the environmental parameters corresponding to the behavior is an amount indicating a peripheral condition, that is, environment of vehicle 1 from the time at which the behavior is started by the vehicle to the time before the first predetermined time passes. The general-purpose running histories are running histories of a large number of unspecified vehicles. For example, a behavior and an environmental parameter set corresponding to the behavior are combined and stored in storage 7. The environmental parameter is a parameter relating to environment of the vehicle and represents, for example, information on own vehicle, information on a front vehicle, a side vehicle, or a rear vehicle with respect to the own vehicle such as relative speeds, a distance between vehicles, and a distance between vehicle heads, information on a merging vehicle with respect to the own vehicle such as relative speeds and a distance between vehicle heads, and position information on own vehicle. The environmental parameter is, for example, a peripheral condition of the vehicle to be detected by state detector 6.

Figure 4:
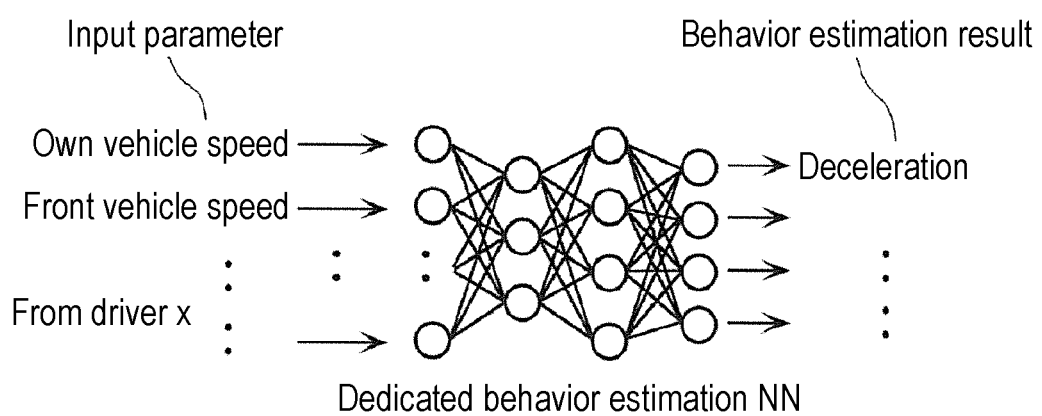
FIG. 4 illustrates an example of behavior estimation by a dedicated behavior estimation neural network.

Learning unit 11 constructs a general-purpose neural network from at least one of general-purpose driving histories and running histories of a large number of unspecified drivers as a general-purpose behavior estimation NN. Further, learning unit 11 adjusts the general-purpose behavior estimation NN using at least one of the driving history and the running history of specific driver x and constructs a dedicated behavior estimation NN corresponding to driver x. For example, as illustrated in FIG. 4 showing an example of behavior estimation by the dedicated behavior estimation NN, during automatic driving of vehicle 1, on which driver x is mounted, by inputting at least one of a feature quantity set and an environmental parameter set obtained at present to the dedicated behavior estimation NN as input parameters, behavior corresponding to driving of driver x and the input information is output. This behavior is, for example, an estimated behavior that can be taken by driver x after the first predetermined time passes. In the example in FIG. 4, the input parameters such as own vehicle speed of vehicle 1 and another vehicle speed are input to the dedicated behavior estimation NN, and the dedicated behavior estimation NN outputs deceleration as the estimated behavior. Note that the dedicated behavior estimation NN may output a plurality of estimated behaviors.

Upon construction of the general-purpose behavior estimation NN, learning unit 11 inputs at least one of the plurality of feature quantities and environmental parameters included in at least one of general-purpose driving histories and running histories of arbitrary drivers to the neural network as input parameters. Furthermore, learning unit 11 optimizes weighting between the nodes of the neural network such that an output from the neural network corresponds to behavior which is supervised-learning data associated with the input parameters. As a result of the weighting adjustment, learning unit 11 makes the neural network learn a relation between the input parameters and the supervised-learning data, and constructs a general-purpose behavior estimation NN corresponding to the arbitrary drivers.

Upon construction of the dedicated behavior estimation NN, learning unit 11 adjusts the general-purpose behavior estimation NN using at least one of the driving history and the running history of specific driver x and constructs the dedicated behavior estimation NN corresponding to driver x. By inputting specific behavior included in at least one of the driving history and the running history of driver x and at least one of a feature quantity set and an environmental parameter set associated with this behavior to the general-purpose behavior estimation NN, learning unit 11 adjusts weighting between the nodes of the general-purpose behavior estimation NN such that the above-described behavior, which is the supervised-learning data, is obtained as an output. Accordingly, in the neural network, the adjustment of weighting between the nodes is also called relearning. Also, the general-purpose behavior estimation NN relearned as described above is treated as a dedicated behavior estimation NN. Relearning of the dedicated behavior estimation NN is performed for each of a plurality of other pieces of supervised-learning data, in addition to a piece of supervised-learning data. In other words, due to transfer learning, learning unit 11 constructs a dedicated behavior estimation NN which is a dedicated neural network to specific driver x.

By inputting at least one of the feature quantity set and the environmental parameter set obtained at present to the dedicated behavior estimation NN constructed by learning unit 11 as the input parameters, behavior estimation unit 12 of automatic driving control system 10 outputs behavior corresponding to the input information as estimated behavior. In other words, behavior estimation unit 12 outputs, for example, a behavior estimation result of vehicle 1 after the first predetermined time passes. Behavior estimation unit 12 outputs the behavior estimation result to automatic driving evaluation unit 13. Note that behavior estimation unit 12 is configured to acquire detection results from operation system detector 3 and state detector 6.

Automatic driving evaluation unit 13 of automatic driving control system 10 determines whether a behavior estimation result from behavior estimation unit 12 is used for automatic driving of vehicle 1. Automatic driving evaluation unit 13 calculates a change amount between present behavior of vehicle 1 and the behavior estimation result of behavior estimation unit 12 and determines validity of the behavior estimation result based on this change amount. Details of automatic driving evaluation unit 13 will be described later.

First processor 100a of image display system 100 acquires a behavior estimation result from behavior estimation unit 12. Based on the acquired behavior estimation result, first processor 100a estimates a position of vehicle 1 after a second predetermined time passes from a present time and outputs the estimated position to comparator 100c of image display system 100. Specifically, first processor 100a estimates displacement of vehicle 1 before and after the second predetermined time passes. The second predetermined time may be identical to the first predetermined time, may be longer or shorter than the first predetermined time, or may be set arbitrarily. For example, the second predetermined time may be a time of several seconds, such as more than or equal to one second and less than or equal to ten seconds. When the behavior estimation result is used for the behavior of vehicle 1, such first processor 100a estimates displacement that occurs to vehicle 1 after the second predetermined time passes. In a case where the estimated behavior is not completed when the second predetermined time passes, displacement of vehicle 1 in a middle of the estimated behavior can be estimated. In a case where the estimated behavior is completed when the second predetermined time passes, displacement of vehicle 1 after completion of the estimated behavior can be estimated. Note that the above displacement of vehicle 1 may be displacement between the positions of vehicle 1 before and after the second predetermined time passes or may be relative displacement to the position of vehicle 1 after the second predetermined time passes with vehicle 1 maintaining current behavior during behavior estimation.

Second processor 100b of image display system 100 acquires a detection result of state detector 6 via vehicle controller 2. Second processor 100b acquires information about a present position and a running state of vehicle 1 and a present position and running states of vehicle(s) around vehicle 1 from the acquired detection result, and mutually associates the information. Second processor 100b may acquire information about a position of an object other than the vehicle around vehicle 1 and associate the information with the position of vehicle 1. Based on the above associations, second processor 100b generates data indicating positional relationships between vehicle 1 and peripheral object(s), such as vehicle(s), around vehicle 1 on the map in the bird's eye view, as illustrated in FIG. 3, for example. Second processor 100b outputs the positional relationships between vehicle 1 and the vehicle(s) around vehicle 1 and the running states of vehicle 1 and the vehicle(s) around vehicle 1 to comparator 100c. At this time, second processor 100b gives an identifier such as an ID to the vehicle(s) around vehicle 1 so that the vehicle(s) can be identified. Note that the ID may be an ID preset to each of the vehicle(s). Such an ID may be acquired, for example, by external environment information acquisition unit 6e through communication via a communication network such as the Internet.

Comparator 100c of image display system 100 compares displacement information on vehicle 1 acquired from first processor 100a and information about present running states of and present mutual positional relationships between vehicle 1 and the vehicle(s) around vehicle 1 acquired from second processor 100b, and calculates future positional relationships between vehicle 1 and peripheral object(s) such as vehicle(s) around vehicle 1. Specifically, comparator 100c generates, as future positional relationship data, data indicating positional relationships between vehicle 1 and vehicle(s) around vehicle 1 after the second predetermined time passes on a map in a bird's eye view. Further, comparator 100c outputs this data to notification device 5b as image data. At this time, comparator 100c calculates a position of vehicle 1 after the second predetermined time passes from displacement information on vehicle 1 and a present position and a speed of vehicle 1. Further, comparator 100c calculates positions of peripheral vehicle(s) 1 after the second predetermined time passes from present positions and speeds of peripheral vehicle(s) 1. Further, comparator 100c outputs data indicating present positional relationships between vehicle 1 and the vehicle(s) around vehicle 1 on a map in a bird's eye view to notification device 5b as image data. Note that the position of vehicle 1 after the second predetermined time passes may be calculated by first processor 100a.

Further, based on the behavior estimation result of vehicle 1 and the present running state of vehicle 1, comparator 100c calculates a future running state of vehicle 1 after the second predetermined time passes and outputs the calculated state to notification device 5b. At this time, comparator 100c may only output a parameter that changes before and after the second predetermined time passes among parameters indicating a running state, such as a speed, brake strength, an accelerator position, and a steering angle. Parameters, such as acceleration, a speed, and a steering angle, corresponding to behavior may be preset, and may be determined from a driving history of a specific driver or driving histories of a plurality of drivers.

Further, first processor 100a may chronologically output displacement of vehicle 1 after the second predetermined time passes, and second processor 100b may chronologically output present positional relationships between vehicle 1 and the vehicle(s) around vehicle 1. Moreover, based on the chronologically acquired information, comparator 100c may chronologically output positional relationships between vehicle 1 and the vehicle(s) around vehicle 1 after the second predetermined time passes.

Further, automatic driving evaluation unit 13 calculates a change amount between present behavior of vehicle 1 and a behavior estimation result output from behavior estimation unit 12. For example, automatic driving evaluation unit 13 compares the change amount and a threshold and validates the behavior estimation result when the change amount is less than or equal to the threshold, that is, when the behavior of vehicle 1 gently changes. Then, automatic driving evaluation unit 13 outputs the behavior estimation result to vehicle controller 2. Furthermore, automatic driving evaluation unit 13 may output the behavior estimation result to notification device 5b of information notification unit 5. As a result, vehicle controller 2 controls vehicle 1 based on the behavior estimation result, and notification device 5b can display behavior in progress.

On the other hand, when the change amount exceeds the threshold, that is, when the behavior of vehicle 1 rapidly changes, automatic driving evaluation unit 13 invalidates the behavior estimation result. Then, automatic driving evaluation unit 13 outputs a control signal indicating that the behavior estimation result is invalid to learning unit 11. Learning unit 11 allows the dedicated behavior estimation NN to relearn so that the behavior estimation result is not output from input parameters corresponding to the invalid behavior estimation result. Regarding the relearning of the dedicated behavior estimation NN, the dedicated behavior estimation NN itself may be allowed to relearn so that the behavior estimation result is not output from the above parameters. Alternatively, after allowing the general-purpose behavior estimation NN to relearn, the dedicated behavior estimation NN may be constructed from the relearned general-purpose behavior estimation NN by using a driving history and a running history of a specific driver. Further, since vehicle controller 2 does not receive the behavior estimation result, current behavior of vehicle 1 is maintained. Note that automatic driving evaluation unit 13 may use an output result of second processor 100b and an output result of comparator 100c to calculate the above change amount.

[2. Operation of Image Display System]

An example of operation of image display system 100 and peripheral components of image display system 100 according to the exemplary embodiment will be described. Herein, with reference to FIG. 1, learning unit 11 of automatic driving control system 10 constructs a dedicated behavior estimation NN corresponding to a running scene of vehicle 1 in construction of a dedicated behavior estimation NN for a specific driver. The running scene includes elements such as running environment, weather during running, and a traffic condition of a vehicle. The running environment of the vehicle indicates road environment such as an urban area and a quiet area. The traffic condition indicates a traffic flow such as congestion. Learning unit 11 constructs a dedicated behavior estimation NN corresponding to the running scene according to transfer learning using a running history of vehicle 1 in various running scenes. Hence, the dedicated behavior estimation NN is constructed for each running scene. Note that the running scene corresponding to the dedicated behavior estimation NN may be composed of one element or may be composed of a combination of a plurality of elements.

Figure 5:
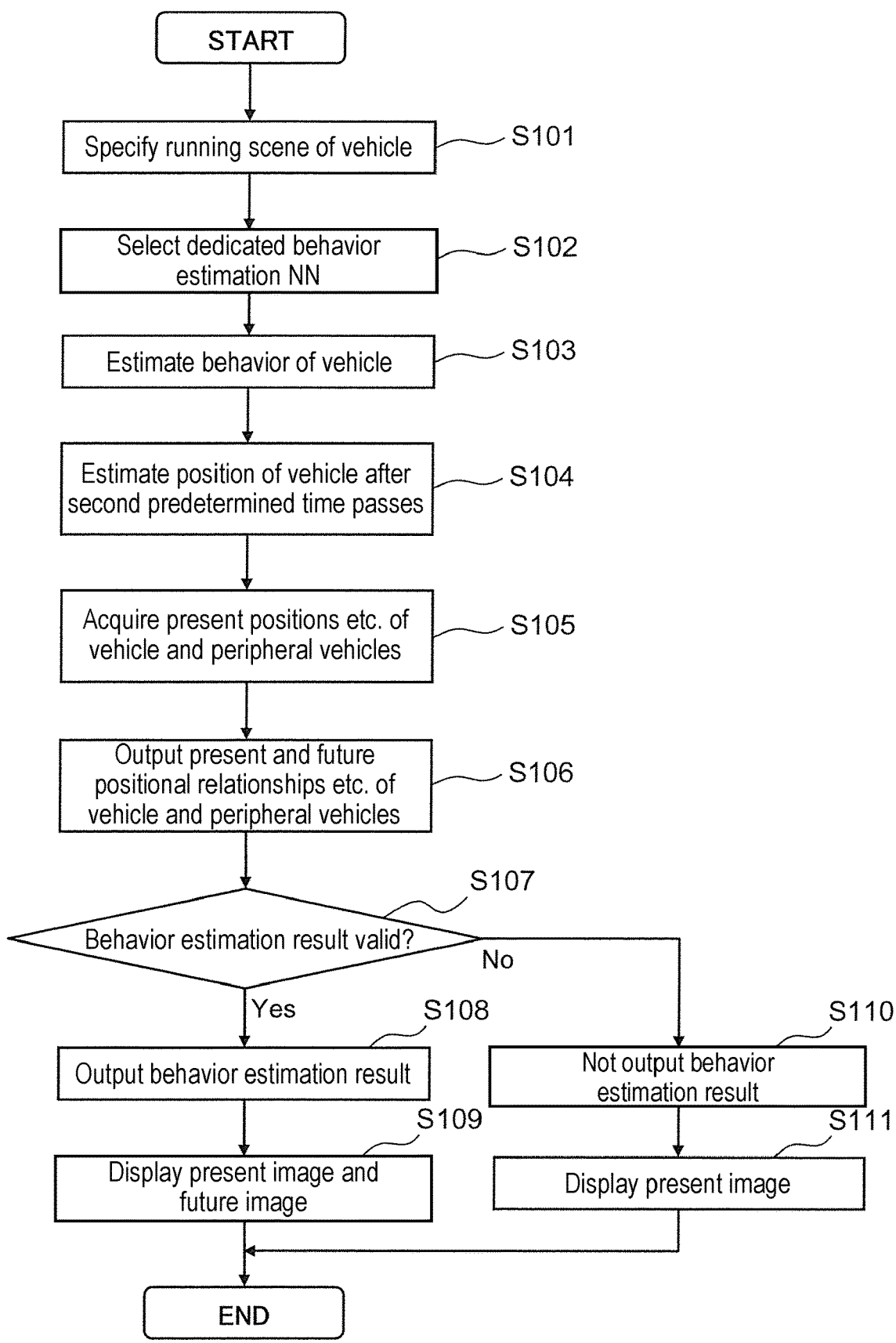
FIG. 5 is a flowchart illustrating an example of a flow of operation of the image display system and the components around the image display system.

With reference to FIG. 5, a flowchart illustrating an example of a flow of operation of image display system 100 and the peripheral components of image display system 100 is illustrated. In step S101, during automatic driving of vehicle 1, learning unit 11 of automatic driving control system 10 acquires, from state detector 6 via storage 7, information about vehicle 1 and conditions around vehicle 1, such as position information on vehicle 1, map information on a position of vehicle 1, traffic jam information, and weather information. Learning unit 11 specifies a running scene of vehicle 1 corresponding to this information from the acquired information. Note that the information about vehicle 1 and conditions around vehicle 1 and the running scene of vehicle 1 may be previously stored in storage 7 in association with each other, and learning unit 11 may specify the running scene of vehicle 1 based on the information stored in storage 7.

Further, in step S102, learning unit 11 selects a dedicated behavior estimation NN corresponding to specific driver x of vehicle 1 and corresponding to the running scene of vehicle 1 from among various dedicated behavior estimation NN stored in storage 7. Then, learning unit 11 outputs the selected dedicated behavior estimation NN to behavior estimation unit 12.

Next, in step S103, by using the acquired dedicated behavior estimation NN, behavior estimation unit 12 performs behavior estimation, that is, prediction of a driving action, of vehicle 1 after a first predetermined time passes from a present time. Specifically, behavior estimation unit 12 inputs parameters about a present running state and a peripheral condition of vehicle 1 acquired from state detector 6 to the dedicated behavior estimation NN, and obtains a behavior estimation result of vehicle 1. Then, behavior estimation unit 12 outputs the behavior estimation result of vehicle 1 to automatic driving evaluation unit 13, that is, first processor 100a of image display system 100.

In step S104, based on the acquired behavior estimation result, first processor 100a estimates a position of vehicle 1 after a second predetermined time passes from a present time and outputs the estimated position to comparator 100c of image display system 100. Although the position of vehicle 1 is not limited, in the present exemplary embodiment, the position of vehicle 1 to be estimated is relative displacement to the position of vehicle 1 after the second predetermined time passes with vehicle 1 maintaining the behavior during the behavior estimation. Note that it is desirable that a length of the second predetermined time be less than or equal to a length of the first predetermined time, and is desirable that the second predetermined time be a time until current behavior is completed, such that estimation displacement of vehicle 1 reflecting the behavior estimation result is output before the estimated behavior is actually started.

Further, in step S105, second processor 100b of image display system 100 calculates present positional relationships between vehicle 1 and peripheral object(s) such as vehicle(s) around vehicle 1 and present running states of vehicle 1 and the vehicle(s) around vehicle 1 based on the information acquired from state detector 6, and outputs the calculated relationships and states to comparator 100c. Note that an order of step S104 and step S105 is not limited to a described order and that the steps may be executed simultaneously or in a reverse order.

Next, in step S106, based on the displacement information on vehicle 1 acquired from first processor 100a and the information on the present running states of and the present mutual positional relationships between vehicle 1 and the vehicle(s) around vehicle 1 acquired from second processor 100b, comparator 100c generates image data indicating the positional relationships between vehicle 1 and the peripheral object(s) such as the vehicle(s) around vehicle 1 after the second predetermined time passes, and outputs the generated image data to notification device 5b of information notification unit 5. Further, based on the information acquired from second processor 100b, comparator 100c generates image data indicating the present positional relationships between vehicle 1 and the peripheral object(s) such as the vehicle(s) around vehicle 1, and outputs the generated image data to notification device 5b of information notification unit 5. Furthermore, based on the behavior estimation of vehicle 1 and the present running state of vehicle 1, comparator 100c calculates parameter values of the running state of vehicle 1 after the second predetermined time passes, and outputs the parameter values that change before and after the second predetermined time passes to notification device 5b.

Further, in step S107, automatic driving evaluation unit 13 calculates a change amount between present behavior of vehicle 1 and the behavior estimation result output from behavior estimation unit 12, and determines validity of the behavior estimation result based on this change amount. Note that an order of step S106 and step S107 is not limited to a described order and that the steps may be executed simultaneously or in a reverse order.

Figure 6:
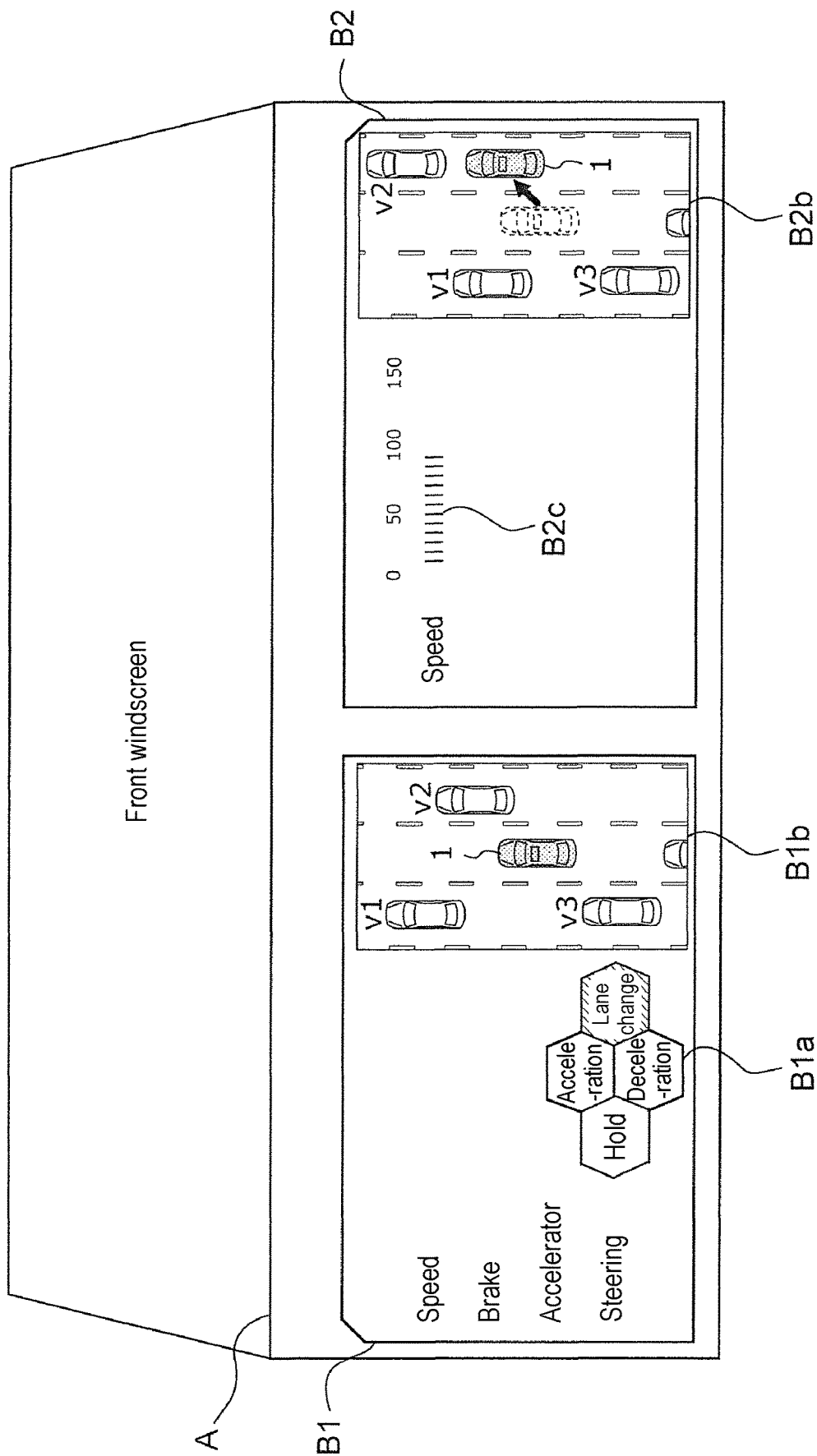
FIG. 6 illustrates an example of a display image of the notification device when a present image and a future image are displayed.

If the behavior estimation result is valid (Yes in step S107), in step S108, automatic driving evaluation unit 13 outputs the behavior estimation result to vehicle controller 2 and notification device 5b of information notification unit 5. Further, in step S109, based on the acquired information, notification device 5b displays present image B1 and future image B2 on the display medium, such as glass A, as illustrated in FIG. 6, for example. Note that FIG. 6 illustrates an example of a display image of notification device 5b when present image B1 and future image B2 are displayed.

In present image B1, notification device 5b displays present behavior of vehicle 1 in behavior display B1a, and displays a present image of vehicle 1 and object(s) around vehicle 1 acquired from comparator 100c in bird's eye view B1b. Notification device 5b may use, as the present behavior of vehicle 1, a behavior estimation result acquired from automatic driving evaluation unit 13, or may use present or current behavior information acquired from vehicle controller 2 via information acquisition unit 5a. Such notification device 5b can display, in behavior display B1a, both of the current behavior and an estimated behavior, which is a behavior to be executed from now on, of vehicle 1 depending on a condition. For example, in FIG. 6, "lane change" is displayed as the present behavior, and vehicle 1 and peripheral vehicles (vehicle IDs are v1 to v3) are displayed on a road having a plurality of lanes in the bird's eye view.

Further, in future image B2, notification device 5b displays an image after the second predetermined time passes of vehicle 1 and the object(s) around vehicle 1 acquired from comparator 100c in bird's eye view B2b. Furthermore, notification device 5b displays, in future image B2, parameter value B2c acquired from comparator 100c and changing before and after the second predetermined time passes. For example, in FIG. 6, a speed of vehicle 1 after the second predetermined time passes is displayed as parameter value B2c. Further, in bird's eye view B2b, vehicle 1 before and after the second predetermined time passes and peripheral vehicles (vehicle IDs are v1 to v3) after the second predetermined time passes are displayed on a road having a plurality of lanes. Vehicle 1 before the second predetermined time passes is displayed by broken lines. Note that, in bird's eye view B2b, as vehicle 1 before the second predetermined time passes displayed by the broken lines, vehicle 1 located at a position before the second predetermined time passes may be displayed, or vehicle 1 after the second predetermined time passes with vehicle 1 maintaining the current behavior during the behavior estimation may be displayed. In the former case, the position of vehicle 1 before the second predetermined time passes may not be an accurate position and may be a position indicating relative positional relationships between vehicle 1 and the peripheral vehicle(s). In the latter case, a driver can confirm a difference in the future position of vehicle 1 between a case where the estimated behavior result is used and a case where the estimated behavior result is not used. Further, vehicle controller 2 controls vehicle 1 according to the estimated behavior result.

If the behavior estimation result is invalid (No in step S107), in step S110, automatic driving evaluation unit 13 does not output the behavior estimation result to vehicle controller 2, and outputs a control signal indicating that the behavior estimation result is invalid to notification device 5b. Next, in step S111, notification device 5b displays only present image B1 on display medium A as illustrated in FIG. 3, for example. Accordingly, when there is no estimated behavior, notification device 5b displays only present image B1. Notification device 5b displays present image B1 similarly to step S108. Since the behavior is on hold, notification device 5b may display "hold" in behavior display B1a or may not display behavior display B1a. When behavior display B1a is not displayed as illustrated in FIG. 3, notification device 5b may display a parameter value about the running state of vehicle 1 based on information acquired by information acquisition unit 5a from operation system detector 3 and state detector 6. Further, vehicle controller 2 controls vehicle 1 according to the current behavior.

Accordingly, a driver of vehicle 1 can visually recognize a present condition of vehicle 1 and a future condition of vehicle 1 by visually observing present image B1 and future image B2. The driver can easily judge whether to accept behavior estimated by automatic driving control system 10 based on the current condition and the future condition of vehicle 1. For example, when the driver cannot accept the estimated behavior, the driver can select another behavior as the next behavior, or can switch the automatic driving to manual driving and drive vehicle 1 along a driver's intention.

Figure 7:
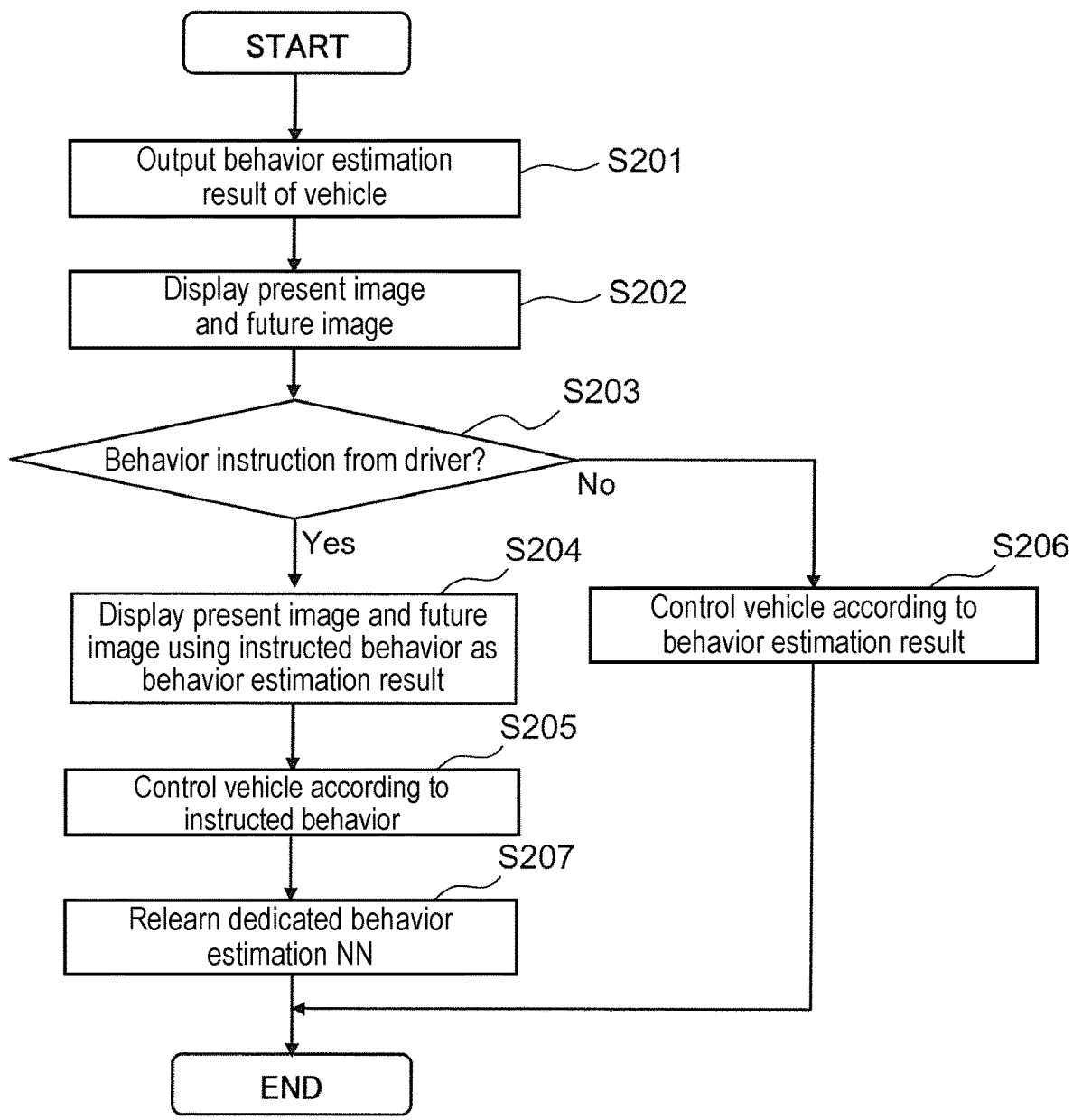
FIG. 7 is a flowchart illustrating another example of a flow of operation of the image display system and the components around the image display system.

Further, in the above example, the behavior control of vehicle 1 by automatic driving control system 10 is not intervened by the driver of vehicle 1. An example of accepting the intervention will be described below. With reference to FIG. 7, a flowchart illustrating another example of a flow of operation of image display system 100 and the peripheral components of image display system 100 is illustrated.

In step S201, learning unit 11 and behavior estimation unit 12 execute processing in steps S101 to S103 in FIG. 5, specifies a running scene of vehicle 1 from information about vehicle 1 and a condition about vehicle 1, and outputs a behavior estimation result of vehicle 1 to image display system 100 by using a dedicated behavior estimation NN corresponding to the specified running scene. For example, in the present example, behavior estimation unit 12 outputs acceleration to vehicle 1 as behavior to be executed next.

Figure 8:
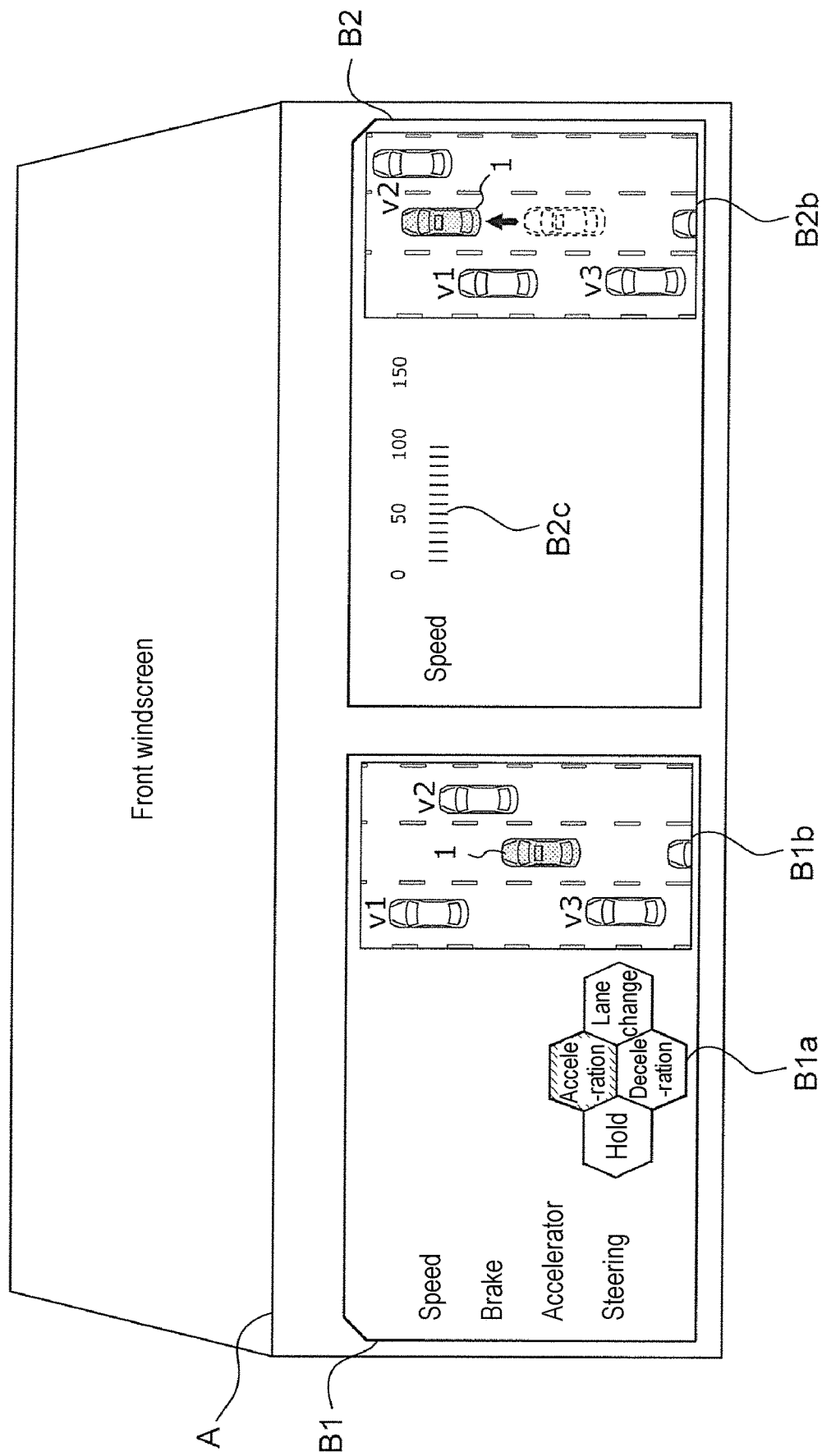
FIG. 8 illustrates an example of a display image of the notification device when a behavior estimation result is acceleration.

Next, in step S202, image display system 100 executes processing similar to processing in steps S104 to S109 in FIG. 5 and allows notification device 5b to display present image B1 and future image B2. For example, in the present example, as illustrated in FIG. 8, notification device 5b displays, in present image B1, "acceleration" in behavior display B1a and present bird's eye view B1b. In future image B2, notification device 5b displays bird's eye view B2b after a second predetermined time passes from a present time, and displays a speed of vehicle 1 which is parameter value B2c that changes before and after the second predetermined time passes. Note that FIG. 8 illustrates an example of a display image of notification device 5b when a behavior estimation result is acceleration.

If an input instructing behavior by the driver of vehicle 1 is executed by input unit 4 (Yes in step S203), image display system 100 acquires instructed behavior information via vehicle controller 2. Furthermore, using the instructed behavior as estimated behavior, image display system 100 executes processing similar to processing in steps S104 to S109 in FIG. 5, and allows notification device 5b to display present image B1 and future image B2 (step S204).

For example, in the present example, the driver of vehicle 1 inputs a behavior "lane change" to input unit 4. In this case, as illustrated in FIG. 9, in present image B1, "lane change" is displayed in behavior display B1a, and present bird's eye view B1b of vehicle 1 and object(s) around vehicle 1 is displayed. Note that FIG. 9 illustrates an example of a display image of notification device 5b according to the instruction of the driver of vehicle 1. Further, "present" and "present time" mean time immediately after the driver of vehicle 1 inputs the behavior "lane change" to input unit 4. In future image B2, bird's eye view B2b of vehicle 1 and object(s) around vehicle 1 after the second predetermined time passes from the present time is displayed, and parameter value B2c that changes before and after the second predetermined time passes, specifically, the speed of vehicle 1 is displayed. Furthermore, automatic driving evaluation unit 13 outputs the instructed behavior to vehicle controller 2, and vehicle controller 2 controls vehicle 1 according to the acquired behavior (step S205).

If the input instructing the behavior by the driver of vehicle 1 is not executed (No in step S203), automatic driving evaluation unit 13 outputs the estimated behavior "acceleration" to vehicle controller 2, and vehicle controller 2 controls vehicle 1 according to the acquired behavior "acceleration" (step S206). In this case, image display system 100 allows notification device 5b to display future image B2 to be generated based on the behavior "acceleration". However, when a behavior change is minute, future image B2 may not be displayed.

In step S207 subsequent to step S205, learning unit 11 of automatic driving control system 10 acquires the instructed behavior of the driver from comparator 100c etc., and performs relearning of a dedicated behavior estimation NN using this driver's instructed behavior as a correct label. Specifically, by using the parameters input to the dedicated behavior estimation NN when behavior estimation unit 12 obtains the behavior estimation result of "acceleration", learning unit 11 adjusts weighting between nodes of the dedicated behavior estimation NN so as to enhance coincidence between an output result obtained by inputting these parameters to the dedicated behavior estimation NN and the correct label "lane change". Then, learning unit 11 stores the adjusted dedicated behavior estimation NN in storage 7.

In this way, when execution of behavior different from the behavior estimation result of automatic driving control system 10 is instructed by the driver of vehicle 1, image display system 100 generates present image B1 and future image B2 corresponding to the instructed behavior. Furthermore, to improve behavior estimation accuracy, automatic driving control system 10 treats the instructed behavior as a correct answer of the behavior estimation result, and performs relearning of the dedicated behavior estimation NN. Note that in the relearning of the dedicated behavior estimation NN, the dedicated behavior estimation NN itself may be allowed to relearn. Alternatively, after allowing the general-purpose behavior estimation NN to relearn, the dedicated behavior estimation NN may be constructed from the relearned general-purpose behavior estimation NN by using a driving history and a running history of a specific driver.

[3. Effects etc.]

As described above, image display system 100 according to the exemplary embodiment includes first processor 100a, second processor 100b, and comparator 100c. First processor 100a acquires a behavior estimation result which is a behavior estimation result of vehicle 1, and generates future position information after a second predetermined time passes of vehicle 1 based on the behavior estimation result. Second processor 100b acquires present information about vehicle 1, and generates present position information on vehicle 1 and object(s) around vehicle 1 based on the acquired information. Comparator 100c compares the future position information on vehicle 1 and the present position information on vehicle 1 and the object(s) around vehicle 1, and generates present image data indicating present positions of vehicle 1 and the object(s) around vehicle 1 and future image data indicating future positions of vehicle 1 and the object(s) around vehicle 1. Furthermore, comparator 100c allows notification device 5b serving as a display device to display present image B1 based on the present image data and future image B2 based on the future image data together. For example, the object(s) around vehicle 1 may be vehicle(s) other than vehicle 1.

In the above configuration, in future image B2, the behavior estimation result and the future positions of vehicle 1 and the object(s) around vehicle 1 reflecting the present position information on vehicle 1 and the object(s) around vehicle 1 are displayed. In present image B1, the present positions of vehicle 1 and the object(s) around vehicle 1 reflecting the present position information on vehicle 1 and the object(s) around vehicle 1 are displayed. By visually observing present image B1 and future image B2 displayed together, a driver of vehicle 1 can visually recognize a difference in vehicle 1 and a peripheral condition of vehicle 1 during automatic driving between the present and the future. Hence, image display system 100 can provide information about future behavior of vehicle 1 and give a sense of security to the driver.

In image display system 100 according to the exemplary embodiment, comparator 100c allows notification device 5b to display present image B1 and future image B2 side by side. In the above configuration, since present image B1 and future image B2 are disposed side by side without being superimposed on each other, the driver of vehicle 1 can easily visually recognize a difference between present image B1 and future image B2.

In image display system 100 according to the exemplary embodiment, the present information about vehicle 1 may include position information and speed information on vehicle 1, map information on a position of vehicle 1, and position information and speed information on the object(s) around vehicle 1. Also, comparator 100c displays, in present image B1 and future image B2, vehicle 1 and the object(s) around vehicle 1 on a map showing the position of vehicle 1. In the above configuration, since vehicle 1 and the object(s) around vehicle 1 are displayed on the map showing the position of vehicle 1, the driver of vehicle 1 can visually recognize vehicle 1 and the object(s) around vehicle 1 along with a condition of road and the like. Hence, the driver of vehicle 1 can recognize conditions of vehicle 1 and the object(s) around vehicle 1 more realistically.

In image display system 100 according to the exemplary embodiment, the behavior estimation result is a result estimated, by using machine learning, from at least one of information on a peripheral condition of vehicle 1 and information on a running state of vehicle 1. In the above configuration, the behavior estimated by using the machine learning can be behavior based on experience of the driver and can be behavior close to behavior estimated by the driver. In other words, the behavior estimated by using the machine learning can be behavior close to feeling of the driver. Hence, it is possible to form future image B2 reflecting intention of the driver. For example, the machine learning may be a neural network.

In image display system 100 according to the exemplary embodiment, comparator 100c acquires present speed information and operation information on vehicle 1 from vehicle 1, calculates a parameter value indicating a future running state of vehicle 1 by using the behavior estimation result and the present speed information and operation information on vehicle 1, and displays the parameter value in future image B2. In the above configuration, since the driver of vehicle 1 can recognize not only the future position of vehicle 1 but also the future running state of vehicle 1 from future image B2, the driver can recognize the future behavior of vehicle 1 more accurately.

Image display system 100 according to the exemplary embodiment accepts a behavior instruction from a driver of vehicle 1, and first processor 100a processes instructed behavior as the behavior estimation result. In the above configuration, even when the behavior intended by the driver of vehicle 1 is instructed, image display system 100 can provide the positions etc. of vehicle 1 and the object(s) around vehicle 1 corresponding to the instructed behavior for the driver.

Further, an image display method according to the exemplary embodiment may be implemented as follows. In other words, in this image display method, present information about a vehicle is acquired, and present position information on the vehicle and object(s) around the vehicle is generated based on the acquired information. Further, a behavior estimation result which is a behavior estimation result of the vehicle is acquired, and future position information after a predetermined time passes of the vehicle is generated based on the behavior estimation result. Furthermore, the future position information on the vehicle and the present position information on the vehicle and the object(s) around the vehicle are compared, and present image data indicating present positions of the vehicle and the object(s) around the vehicle and future image data indicating future positions of the vehicle and the object(s) around the vehicle are generated. Furthermore, a present image based on the present image data and a future image based on the future image data are displayed together.

Note that the above method may be implemented by a micro processing unit (MPU), a CPU, a processor, a circuit such as an LSI, an integrated circuit (IC) card, a single module, or the like. Effects similar to those of image display system 100 according to the exemplary embodiment can be also obtained in the above method.

Further, processing in the exemplary embodiment may be implemented by a software program or a digital signal consisting of the software program. For example, the processing in the exemplary embodiment is implemented by the following program. In other words, this program is a program for causing a computer to execute an image display method, and in this image display method, present information about a vehicle is acquired, present position information on the vehicle and object(s) around the vehicle is generated based on the acquired information, a behavior estimation result which is a behavior estimation result of the vehicle is acquired, and future position information after a predetermined time passes of the vehicle is generated based on the behavior estimation result. Further, in this image display method, the future position information on the vehicle and the present position information on the vehicle and the object(s) around the vehicle are compared, and present image data indicating present positions of the vehicle and the object(s) around the vehicle and future image data indicating future positions of the vehicle and the object(s) around the vehicle are generated. Furthermore, in this image display method, a present image based on the present image data and a future image based on the future image data are displayed together.

Note that the above program and the digital signal consisting of the above program may be recorded onto a computer-readable recording medium such as a flexible disk, a hard disk, a compact disk (CD)-ROM, a magneto-optical disk (MO), a digital versatile disk (DVD), a DVD-ROM, a DVD-RAM, a Blu-ray (registered trademark) disk (BD), and a semiconductor memory.

Further, the above program and the digital signal consisting of the above program may be transmitted via a network represented by a telecommunications line, a wireless or wired communication line, and the Internet, data broadcasting, and the like. Further, the above program and the digital signal consisting of the above program may be performed by another computer system that is independently provided, by being recorded onto a recording medium to be transported to the other computer, or by being transported to the other computer via networks and the like.

[Others]

The exemplary embodiment has been described above as an example of the technique disclosed in the present application. However, the technique of the present disclosure is not limited thereto, and is applicable to a modification of the exemplary embodiment or another exemplary embodiment in which a change, a replacement, an addition, or an omission is appropriately made. In addition, new exemplary embodiments or modifications can be made by combining components in the exemplary embodiment.

For example, the processors included in the image display system and the like according to the exemplary embodiment are typically implemented as an LSI serving as an integrated circuit. Each of the components may be integrated into one chip, or some or all of the components may be integrated into one chip. Further, the circuit integration is not limited to the LSI, and may be achieved by a dedicated circuit or a general-purpose processor. There may be used: a field programmable gate array (FPGA) programmable after the LSI is fabricated; or a reconfigurable processor in which connections and settings of circuit cells in the LSI are reconfigurable.

Note that in the exemplary embodiments, the components may be implemented by dedicated hardware or by execution of software programs individually suitable for the components. The components may be implemented by a program execution section, such as a CPU or a processor, reading and executing software programs recorded onto a recording medium, such as a hard disk or a semiconductor memory.

Furthermore, the technique of the present disclosure may be the above program or may be a non-transitory computer-readable recording medium onto which the above program is recorded. Needless to say, the above program can be distributed via a transmission medium such as the Internet.

All the numerals such as ordinal numbers and quantities described above are used only for the specific illustration of the technique of the present disclosure, and the present disclosure is not limited to the illustrated numerals. Further, the connection relationships between the components are used only for the specific illustration of the technique of the present disclosure, and the connection relationships implementing functions of the present disclosure are not limited to the illustrated connection relationships.

The division of the functional block in the block diagram is only by way of example, and a plurality of functional blocks may be implemented as one functional block, one functional block may be divided into a plurality of functional blocks, or a part of the functions may be transferred to another functional block. Functions of a plurality of functional blocks having similar functions may be processed in parallel or in a time division manner by single piece of hardware or software.

INDUSTRIAL APPLICABILITY

An image display system and the like of the present disclosure can be applied to a device or a system that processes information about driving of a vehicle.

REFERENCE MARKS IN THE DRAWINGS

1: vehicle
5b: notification device (display device)
100: image display system
100a: first processor
100b: second processor
100c: comparator
B1: present image
B2: future image
1a: dashboard
2: vehicle controller
3: operation system detector
3a: brake sensor
3b: accelerator sensor
3c: blinker sensor
3d: steering sensor
4: input unit
5: information notification unit
5a: information acquisition unit
6: state detector
6a: position information acquisition unit
6b: peripheral sensor
6c: speed information acquisition unit
6d: map information acquisition unit
6e: external environment information acquisition unit
7: storage
10: automatic driving control system
11: learning unit
12: behavior estimation unit
13: automatic driving evaluation unit
B1a: behavior display
B1b: bird's eye view
B2b: bird's eye view
B2c: parameter value

The invention claimed is:

1. An image display system comprising:
a processor; and
a memory coupled to the processor, the memory storing a program that, when executed by the processor, causes the image display system to:
acquire a behavior estimation result of a vehicle, and generate future position information of the vehicle after a predetermined time passes from a present time based on the behavior estimation result;
acquire present information about the vehicle, and generate present position information of the vehicle and an object around the vehicle based on the acquired present information;
compare the future position information of the vehicle and the present position information of the vehicle and the object around the vehicle, and generate present image data indicating present positions of the vehicle and the object around the vehicle and future image data indicating future positions of the vehicle and the object around the vehicle; and
allow a display device to display a present image based on the present image data and a future image based on the future image data together,
wherein:
the future image includes a parameter value indicating a future running state of the vehicle, the parameter value being based on the behavior estimation result and acquired present speed information and operation information of the vehicle, or
the behavior estimation result is a result based on a behavior instruction acquired from a driver of the vehicle.

2. The image display system according to claim 1, wherein the program, when executed by the processor, causes the image display system to:
allow the display device to display the present image and the future image side by side.

3. The image display system according to claim 1, wherein
the present information about the vehicle includes position information and speed information of the vehicle, map information on a position of the vehicle, and position information and speed information of the object around the vehicle, and
the program, when executed by the processor, causes the image display system to:
display, in the present image and the future image, the vehicle and the object around the vehicle on a map showing the position of the vehicle constructed based on the present information about the vehicle.

4. The image display system according to claim 2, wherein
the present information about the vehicle includes position information and speed information of the vehicle, map information on a position of the vehicle, and position information and speed information of the object around the vehicle, and
the program, when executed by the processor, causes the image display system to:
display, in the present image and the future image, the vehicle and the object around the vehicle on a map showing the position of the vehicle constructed based on the present information about the vehicle.

5. The image display system according to claim 1, wherein
the behavior estimation result is a result estimated, by using machine learning, from at least one of information on a peripheral condition of the vehicle and information on a running state of the vehicle.

6. The image display system according to claim 1, wherein the program, when executed by the processor, causes the image display system to:
acquire the present speed information and the operation information of the vehicle from the vehicle,
calculate the parameter value indicating the future running state of the vehicle using the behavior estimation result and the present speed information and the operation information of the vehicle, and display the parameter value in the future image.

7. The image display system according to claim 1, wherein the program, when executed by the processor, causes the image display system to:

receive the behavior instruction from the driver of the vehicle, and process the behavior instruction as the behavior estimation result.

8. The image display system according to claim 1, wherein when the behavior estimation result is the result based on the behavior instruction acquired from the driver of the vehicle, the future image includes the parameter value indicating the future running state of the vehicle, the parameter value being based on the behavior estimation result and the acquired present speed information and operation information of the vehicle.

9. The image display system according to claim 1, wherein when the future image includes the parameter value indicating the future running state of the vehicle, the behavior estimation result is the result based on the behavior instruction acquired from the driver of the vehicle.

10. An image display method comprising:

acquiring present information about a vehicle, and generating present position information of the vehicle and an object around the vehicle based on the acquired present information;

acquiring a behavior estimation result that is a behavior estimation result of the vehicle, and generating future position information of the vehicle after a predetermined time passes from a present time based on the behavior estimation result;

comparing the future position information of the vehicle and the present position information of the vehicle and the object around the vehicle, and generating present image data indicating present positions of the vehicle and the object around the vehicle and future image data indicating future positions of the vehicle and the object around the vehicle; and displaying a present image based on the present image data and a future image based on the future image data together, wherein:

the future image includes a parameter value indicating a future running state of the vehicle, the parameter value being based on the behavior estimation result and acquired present speed information and operation information of the vehicle, or the behavior estimation result is a result based on a behavior instruction acquired from a driver of the vehicle.

11. A non-transitory recording medium describing a program for causing a computer to execute an image display method, the image display method comprising:

acquiring present information about a vehicle, and generating present position information of the vehicle and an object around the vehicle based on the acquired present information;

acquiring a behavior estimation result that is a behavior estimation result of the vehicle, and generating future position information after a predetermined time passes of the vehicle based on the behavior estimation result;

comparing the future position information of the vehicle and the present position information of the vehicle and the object around the vehicle, and generating present image data indicating present positions of the vehicle and the object around the vehicle and future image data indicating future positions of the vehicle and the object around the vehicle; and displaying a present image based on the present image data and a future image based on the future image data together, wherein:

the future image includes a parameter value indicating a future running state of the vehicle, the parameter value being based on the behavior estimation result and acquired present speed information and operation information on the vehicle, or the behavior estimation result is a result based on a behavior instruction acquired from a driver of the vehicle.

* * * * *